March 14, 1961     C. A. WATERS     2,974,700
FEEDING AND CUTTING MEATS
Filed April 1, 1957     4 Sheets-Sheet 1
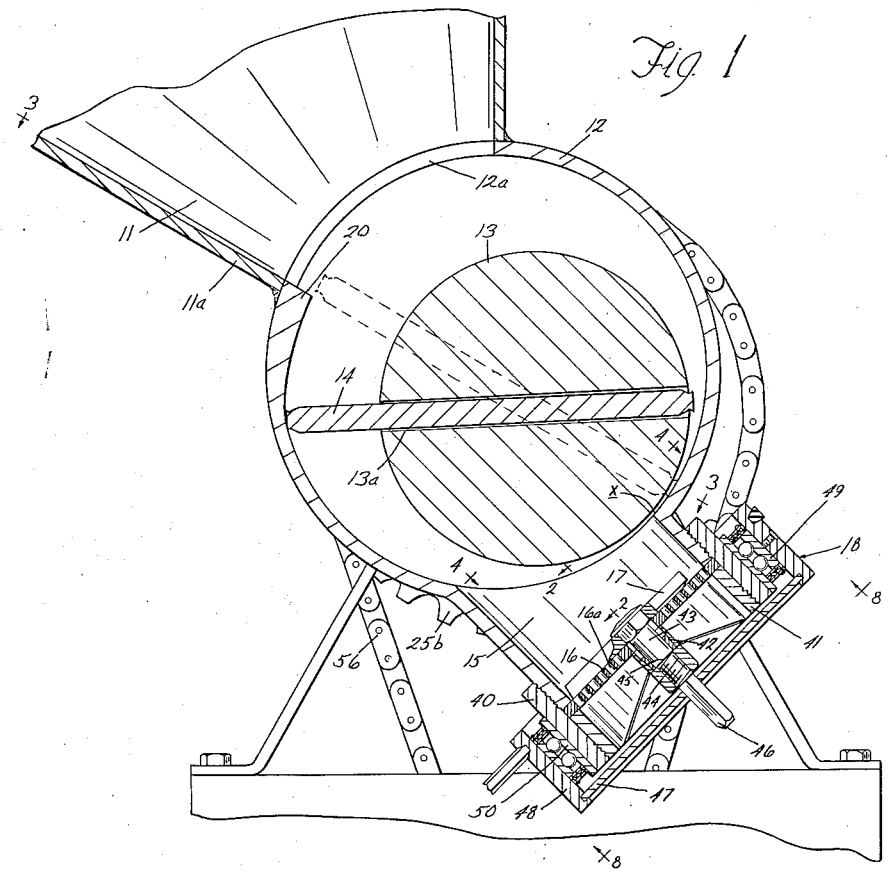
INVENTOR.
Cecil A. Waters
BY
Atty.

March 14, 1961 C. A. WATERS 2,974,700
FEEDING AND CUTTING MEATS

Filed April 1, 1957 4 Sheets-Sheet 2

INVENTOR.
Cecil A. Waters
BY Greek Wells
Atty.

March 14, 1961  C. A. WATERS  2,974,700
FEEDING AND CUTTING MEATS
Filed April 1, 1957  4 Sheets-Sheet 3
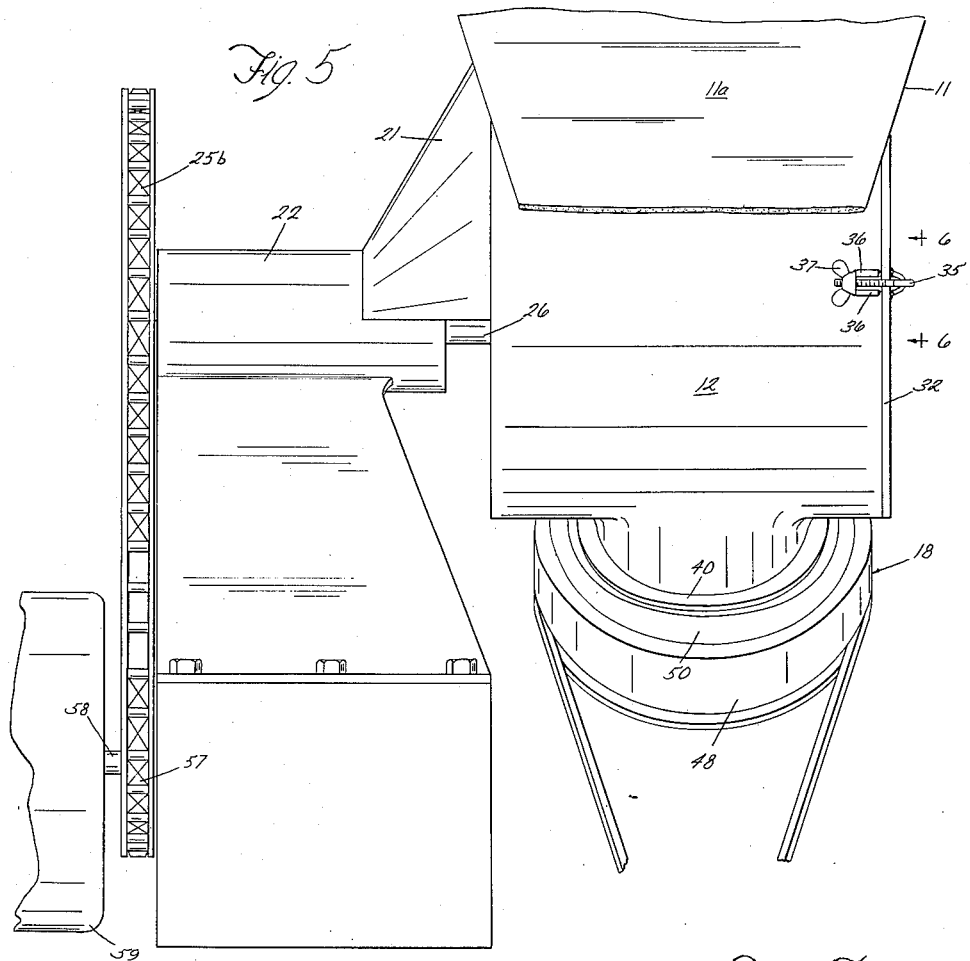
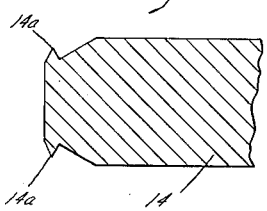
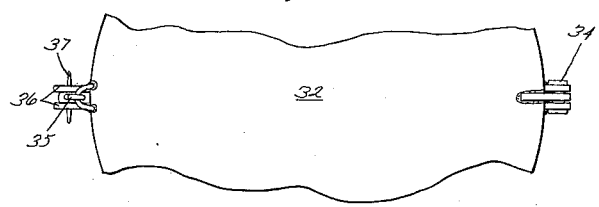
INVENTOR.
Cecil A. Waters
BY
Atty.

March 14, 1961   C. A. WATERS   2,974,700
FEEDING AND CUTTING MEATS
Filed April 1, 1957   4 Sheets-Sheet 4
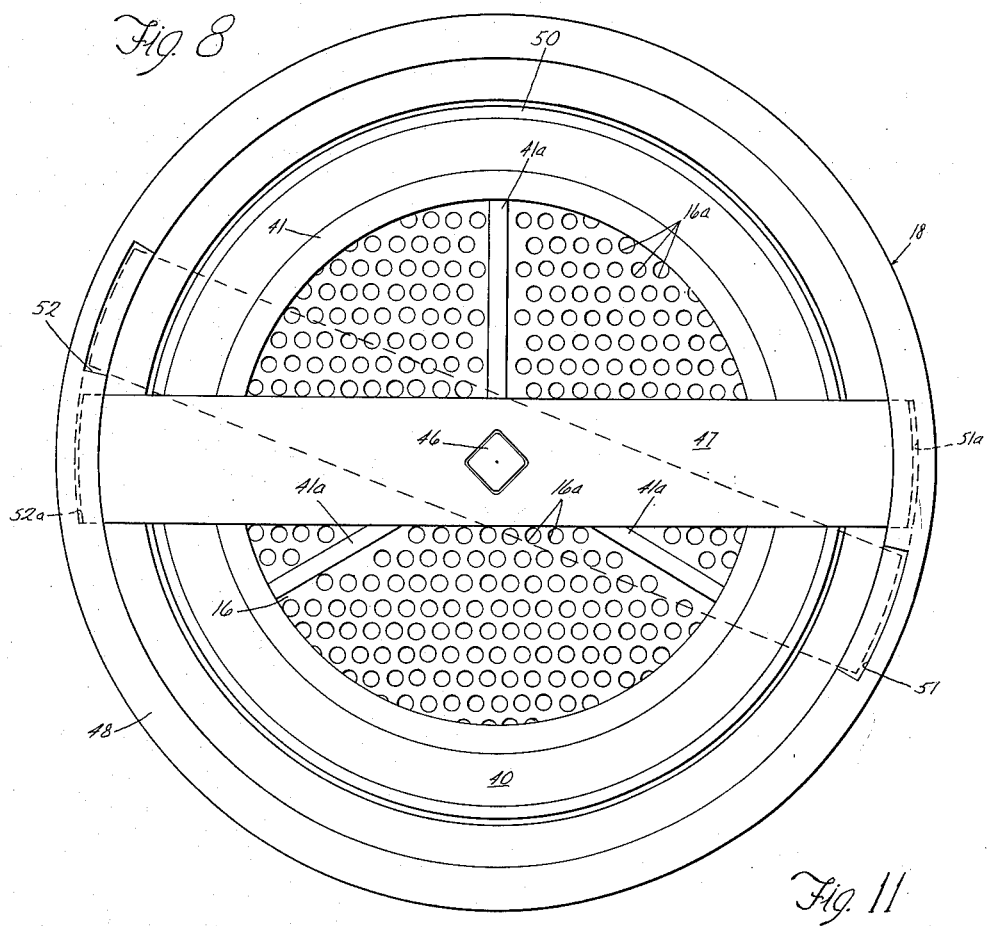
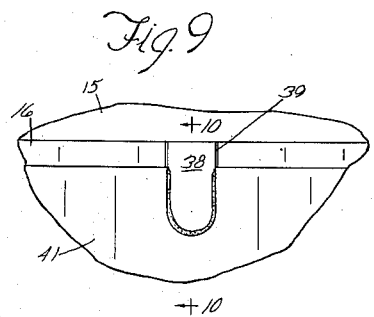
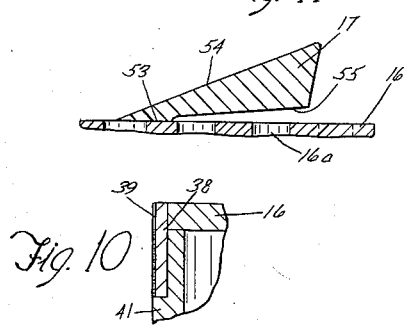
INVENTOR.
Cecil A. Waters
BY
Atty.

United States Patent Office 2,974,700
Patented Mar. 14, 1961

2,974,700

FEEDING AND CUTTING MEATS

Cecil Anthony Waters, Manhattan, Mont., assignor, by decree of distribution, to Lola Waters Filed Apr. 1, 1957, Ser. No. 649,904

5 Claims. (Cl. 146—123)

My invention relates to a machine for feeding and cutting meats. In the making of ground meats such as hamburger and similar products for use fresh, it is common practice to comminute the meat by feeding it into a so called meat grinder where a screw advances the meat against a perforated die and cutter, cutting off the meat as it is forced into the die. The difficulty with the present day machines is that they do too much grinding and squeezing of the meat so as to force the meat juices out of the tissues, and crushes the tissues. The breaking down of the natural structure of the meat and the pressing out of the juices forms an inferior product which is quite different in taste from the original meat before it is ground. Furthermore the compression of the meat by the screw action into the dies produces a substantial amount of heat beyond that which I have found to be necessary so that the quality of the meat is deteriorated. It is a well known fact that the beef, as it is now ground, discolors rapidly and does not hold its color nearly as well as it does before grinding. The natural meat juices drip out of the grinder and are usually lost.

It is the purpose of my invention to provide a device for feeding and cutting the meat to the degree of fineness normally found in hamburger and the like, wherein the juices are retained in the meat and the fibrous structure of the meat is not destroyed by pressure and grinding.

It is also a purpose of my invention to provide a meat feeding and cutting device of the character above referred to wherein the entire feeding apparatus moves the meat slowly and with a minimum of disturbance of the natural structure of the meat, pressing it against a die where a high speed cutter slices off that portion of the meat forced into the die by the pressure.

More particularly it is a purpose of my invention to provide a meat feeding and cutting device wherein the meat is removed from a hopper into a cylinder by a blade which rotates on an axis offset with respect to the axis of the cylinder and the meat is gradually compressed by the blade and the cylinder and forced into a small chamber by back pressure and side compression in such a fashion that the pressure against the perforated die is substantially steady and uniform over the die face.

I have found that by compressing the meat gradually from the rear and from the side after it is forced into the die and cutting it in the manner which will be hereinafter described, all of the meat juices are retained and by mixing the meat free of pressure as it leaves the die, I am able to produce a meat product with the juices retained therein so that there is no drip whatsoever, and there is substantially no crushing of the meat fibers. I have found also that by handling the meat in this fashion I can maintain the temperature, due to the cutting, within a range of two degrees from the entry of the meat into the cutter until it is discharged.

It is also a purpose of my invention to provide a machine of this character wherein the meat feeding blade and its rotor are readily removable to expose the entire interior of the machine for cleaning and to expose the parts for easy cleaning.

The nature and advantages of my invention will appear more fully from the following description and the accompanying drawings. It should be understood that the drawings and description are illustrative only and are not intended to limit the invention except insofar as it is limited by the claims.

In the drawings:

Figure 1 is a vertical sectional view taken through a machine embodying my invention;

Figure 2 is an enlarged fragmentary section taken on the line 2—2 of Figure 1, showing the manner in which the throat of the machine is restricted in advance of the cutter;

Figure 5 is a side view looking at Figure 1 from the left;

Figure 6 is an enlarged fragmentary end view taken on the line 6—6 of Figure 5;

Figure 7 is an enlarged detailed sectional view showing the tip of the feeding blade;

Figure 8 is a bottom face view looking into the cutter mechanism from the line 8—8 on Figure 1;

Figure 9 is a detailed view illustrating the manner in which the perforated die is secured in position in the machine;

Figure 10 is a sectional view on the line 10—10 of Figure 9; and

Figure 11 is an enlarged sectional view on the line 11—11 of Figure 4.

Figure 3:
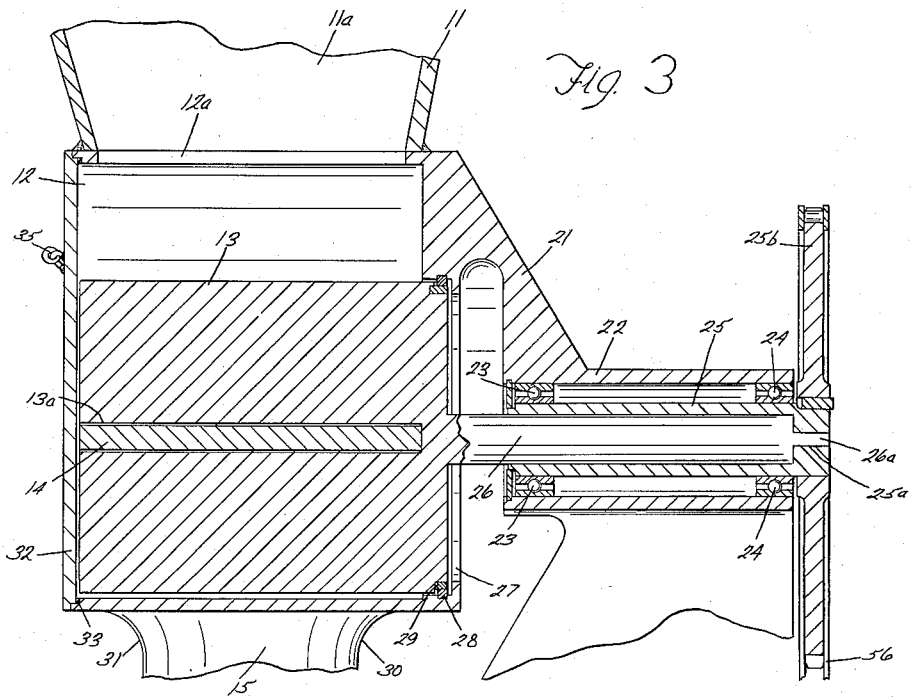
Figure 3 is a sectional view through the cylinder of the machine taken substantially on the line 3—3 of Figure 1.
Figure 4:
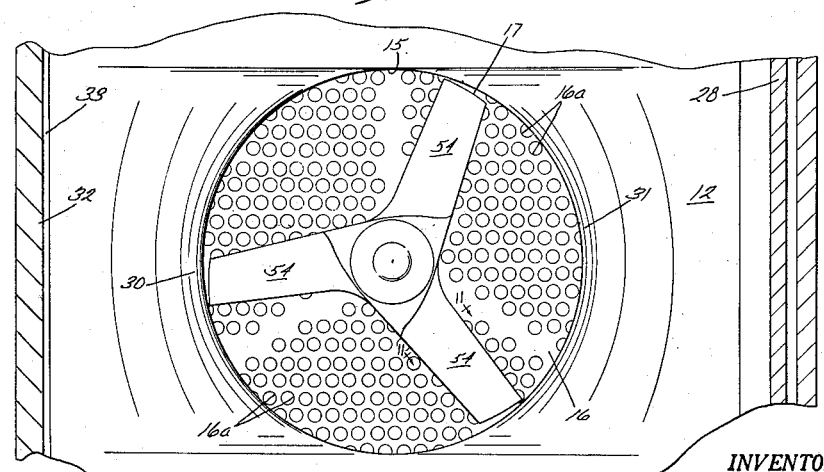
Figure 4 is a sectional view taken substantially on the line 4—4 of Figure 1, with the rotor removed and further illustrating the throat of the machine where the meat is advanced from the feed cylinder to the cutter.

Referring now in detail to the drawings and in particular to Figure 1, my improved meat cutting machine is made up essentially of a hopper 11 in which the meat is placed for feeding into a cylinder 12. The cylinder 12 has a compression rotor 13, a sliding blade 14 in the rotor, a feeding throat 15, a perforated die 16 at the outlet end of the feed throat, a cutter 17 and a drive mechanism for the cutter indicated generally by the numeral 18. The construction of the hopper 11 is such that it provides a flat lower wall 11a that slopes downwardly toward the cylinder 12 to feed the meat into an inlet aperture 12a of the cylinder. The cylinder 12 has its interior contour provided with a ledge 20 that coincides with the bottom wall 11a of the hopper and this ledge is offset inwardly from the cylinder wall above it so that the feeding blade 14 of the rotor 13 just clears the edge of the ledge 20. Meats fed into the opening 12a from the hopper 11 into the cylinder 12 are carried by the blade 14 past the ledge 20 and immediately placed under compression as they pass this ledge.

The cylinder 12 has formed thereon a bracket 21 which provides a bearing sleeve 22 to receive bearings 23 and 24 which support a tubular shank 25 for rotation in the sleeve 22. The shank 25 removably mounts a drive stem 26 for the rotor 13. The stem 26 has a flat end portion 26a which seats in a corresponding slot 25a of the shank 25 so as to cause the stem 26 to rotate the shank 25. It will be noted from Figure 3 that the end of the cylinder 12 carries the bracket 21 and is provided with an enlarged opening 27 and immediately inside the opening is a seal 28 adapted to cooperate with a sealing ring 29 on the rotor 13 to keep the meats from working out around the end of the rotor.

The rotor 13 is mounted on an axis that lies above a line from the ledge 20 to the top of the outlet throat 15 from the cylinder 12 to the die 16 and the cutter 17.

The rotor is also mounted to provide a small clearance at X in Figure 1, between the surface of the rotor and the interior surface of the rotor 12 at the top of the outlet throat 15. This small clearance which is of the order of 3/32 inch is provided to permit the escape of air that may become entrapped with the meats. The rotor 13 has a transverse slot 13a in which the compression blade 14 is free to slide. The clearance shown in Figure 1 is exaggerated, as the blade 14 needs to have only a sufficient clearance to slide free. The blade 14 is slightly less in length than the diameter of the cylinder 12. Its length is just sufficient to fit between the ledge 20 and the wall of the cylinder opposite thereto along a straight line through the axis of the rotor 13. The blade 14, as illustrated best in Figure 7, is a solid blade of substantial thickness, having its end slightly reduced and provided with sharpened undercut edges 14a. The blade extends the full length of the hollow interior of the cylinder 12 and is free to slide within the rotor 13. By positioning the rotor axis and the throat 15 as hereinbefore described with respect to the cylinder 12, it will be observed that the blade 14 is caused to cut off and place under compression any meat in front of it as it advances past the ledge 20. The blade continues to sweep the meat into the throat 15 under compression until it reaches the throat itself, so that there is a very small portion of its travel when it is not holding meat under compression against the die 16. The clearance at X permits air to escape in case there is any entrapped air in the meat.

It will be noted that the outlet throat 15 is much smaller in cross section than the cylinder 12. Its radius in fact is less than half the radius of the cylinder 12. The throat is circular in cross section and the entrance to the throat is curved (see Figure 2) as indicated at 30 and 31 so as gradually to restrict the throat as it approaches the die 16. The construction shown enables me to have substantially uniform pressure of meat against the die 16 over its entire surface in such a direction as soon as the knife 17 slices off the meat that is pressed into the opening 16a of the die 16 and moved out of the way, that the meat will be forced against the die again to penetrate into the opening.

The end of the cylinder remote from the drive shaft 26 of the rotor 13 is closed by a plate 32 which seats against a packing ring 33 in the end of the cylinder. The door 32, as shown best by Figures 5 and 6, is pivoted to the cylinder by a pivot 34 and is latched closed by a latch mechanism comprising a pivoted bolt 35 on the door 32, two ears 36 on the cylinder 12 and a wing nut 37 on the bolt which can be tightened to clamp the door in position. To disassemble the parts of the cylinder for cleaning, the bolt 35 is released and the door swung open. This exposes the compression blade 14 so it can be pulled out of the rotor 13, and the rotor 13 with its drive shaft 26 can be pulled out of the shank 25. This leaves the interior of the cylinder completely open for washing.

The means for driving the cutter 17 is shown and described in detail in my prior application, Serial No. 569,399, filed March 5, 1956, now United States Patent No. 2,865,417, issued on December 23, 1958. The construction is such that the cutting mechanism can also be easily removed. The die plate 16 seats against the outer end of the shell that forms the throat 15. A sleeve 40 is threaded on the throat member 15 and extends outwardly beyond this member. A clamping ring 41 is threaded into the sleeve 40 against the die plate 16, and has a tooth 38 that seats in a recess 39 in the edge of the die plate 16 to lock the die plate against rotation. This ring 41 has a central bearing 42 for the knife driving member 43. This knife driving member seats in the knife 17 which has a polygonal opening for it and is secured against removal by a nut 44 thereon. The driving member 43 has a shoulder 45 stopping the nut 44 short of the bearing 42 so that the knife is not clamped against the die but is free to turn and has a limited end play. The knife is held in position against the die 16 by pressure of the meat in the throat 15. The outer end of the member 42 is a polygonal portion 46 which extends through a lock bar 47 that locks into a drive pulley 48 in the manner illustrated in Figure 8, to establish a driving connection between the pulley 48 and the member 43 to drive the knife 17. Bearings 49 and 50 journal the pulley 48 on the sleeve 40. As shown in Figure 8, the bar 47 fits into undercut slots 51 and 52 which are formed in the pulley 48 so that when the pulley is driven in the proper direction to turn the knife 17 to cut the meat in the apertures 16a of the die plate 16, the bar 47 is forced into the covered portions 51a and 52a of the slots 51 and 52.

The bar 47 functions to establish driving connection between the pulley 48 and the member 43, which also functions as a mixer for the meat as it is discharged from the die plate 16 between the spokes 41a of the ring 41. Since the pulley 48 is driven at a speed of the order of 650 r.p.m. the bar 47 overturns the meat after it is cut and does a thorough job of mixing it. Since the cutter 17 is pressed against the die 16 solely by pressure of the meat, it maintains a very sharp edge and is not dulled by continued use to any appreciable extent. In Figure 11, I have shown the cross section of the blade 17. This figure shows that the ledge 53 of the blade that rests on the die 16 is quite wide so that there is no rocking of the blade. The surface of the blade opposite the ledge 53 indicated at 54 in Figure 11, makes an angle of less than 30 degrees with the ledge 53. At the rear end of the knife blade there is an abrupt undercut face 55 which I have found quite important in the blade. It apparently causes the meat to drop off as it clears the blade and penetrates into the die farther than otherwise would be the case. I have tried cutters without this abrupt drop off at the rear edge and found that they would not work successfully.

The drive mechanism for the rotor 13 comprises a sprocket wheel 25b on the shank 25 and a suitable drive chain 56. The chain 56 is driven by another sprocket wheel 57 which is mounted on the shaft 58 of a power unit 59. The preferred speed of rotation of the rotor 13 is about 9 r.p.m.

It is believed that the construction and operation of my machine will be clear from the foregoing description. I have found that it is important to have the by-pass clearance at X to release any entrained air and to avoid excessive pressure in the throat of the machine. It is also important that the blade 14 be shorter than the chamber diameter so that it is riding free in the chamber at all times. I have found from tests that this machine will cut the meat from large chunks of a size that will just enter the space between the rotor and the ledge 20 with a very slight rise in temperature, which is of course, vitally important in preventing the spoiling of meat. Also in cutting thousands of pounds of meat with this machine, I have not found any drip of juices from the machine. When the ground meat is placed in a pan and subsequently removed, I haven't found any juices free in the bottom of the pan. This is, of course, with meats that have not been frozen since freezing ruptures the cells in the meat and frees some of the juices. I attribute these remarkable results to the fact that the meat, before being cut as it is wedged into the die 16, has very little movement imparted to it. This movement is a gradual compression with a minimum amount of distortion.

I a aware of Patent No. 550,071, by Hundenborn et al., which illustrates a sliding blade and rotor type of feed to a meat cutter. My invention differs from this machine in that it provides a tapering outlet throat from the compression cylinder to a tube of greatly reduced cross section which directs the meat to the die and which compresses the meat from the sides and the rear toward the die. I also provide a clearance between the throat and the cylinder at the top of the throat for the escape of air. Furthermore, the compression blade is of such a construction that it avoids presenting a sharp edge toward the cylinder wall but presents cutting edges projecting forwardly at both ends of the blade. The compression blade has projecting cutting edges facing in the direction of rotation of the blade regardless of how the blade is inserted in the rotor slot. All of these features of my meat cutter cooperate to move the meat to and through the die with a minimum working and keeps the temperature rise down and the juices of the meat in place.

Having thus described my invention, I claim:

1. Means to feed meat pieces from a hopper to a meat cutter, said means comprising a horizontal cylindrical shell with one end open and a smaller circular opening in its other end offset from the axis of the shell laterally and downwardly, a releasable door closing said open end, a feed opening on top of the shell to the interior of the shell, a downwardly directed tapering outlet throat in the bottom of the shell substantially opposite the feed opening, the throat terminating in a tube of less than half the diameter of the shell, a cylindrical rotor in the shell concentric with the said smaller circular opening and covering it, said rotor having a diametric slot therein open at its end next to said door and extending to the other end of the shell, and a compressor blade slidable in said slot crosswise of the rotor, the compressor blade extending the length of the shell interior.

2. The invention defined in claim 1 wherein the blade has its ends provided with forwardly directed V-shaped cutters.

3. The invention defined in claim 1 wherein the shell has a bracket fixed thereto at its said other end and said rotor has a stem rotatably and slidably mounted by said bracket.

4. The invention defined in claim 1 wherein a bracket is fixed to said shell at its said other end, a tubular shank is journalled in said bracket, the rotor has a stem slidably mounted in said shank and the shell and rotor have cooperating bearing seals in said smaller circular opening.

5. In a feeding and cutting machine for meats, a horizontal cylindrical shell having an inlet opening in the upper curved wall thereof said shell having a tapering outlet throat in the lower curved wall thereof substantially opposite said inlet opening, said throat terminating in a reduced tube, one end of said shell being open, a releasable cover for said end, the other end of the shell having a smaller circular opening therein offset downward and laterally with respect to the center line of the shell, said shell having a circular seat around said circular opening, a rotor having a cylindrical end portion fitting in said seat and a drive stem projecting through said opening, the rotor having a diametric slot extending from the end thereof remote from the stem and terminating short of the portion fitting in said seat, and a compressor blade extending the length of the shell and slidably mounted in said rotor slot for sliding movement radially and axially of the rotor, the compressor blade, the rotor and its drive stem being removable from said shell through the open end thereof upon release of said cover.

References Cited in the file of this patent

UNITED STATES PATENTS

| | | |
|---|---|---|
| 271,398 | Baker | Jan. 30, 1883 |
| 550,071 | Hundenborn et al. | Nov. 19, 1895 |
| 643,549 | Smith | Feb. 13, 1900 |
| 1,796,677 | Wilson | Mar. 17, 1931 |
| 2,615,399 | Edwards | Oct. 28, 1952 |
| 2,782,725 | Hojberg | Feb. 26, 1957 |
| 2,840,318 | Schnell | June 24, 1958 |